Feb. 28, 1933.   R. J. BLUM   1,899,790
FISHING APPARATUS
Filed May 13, 1931
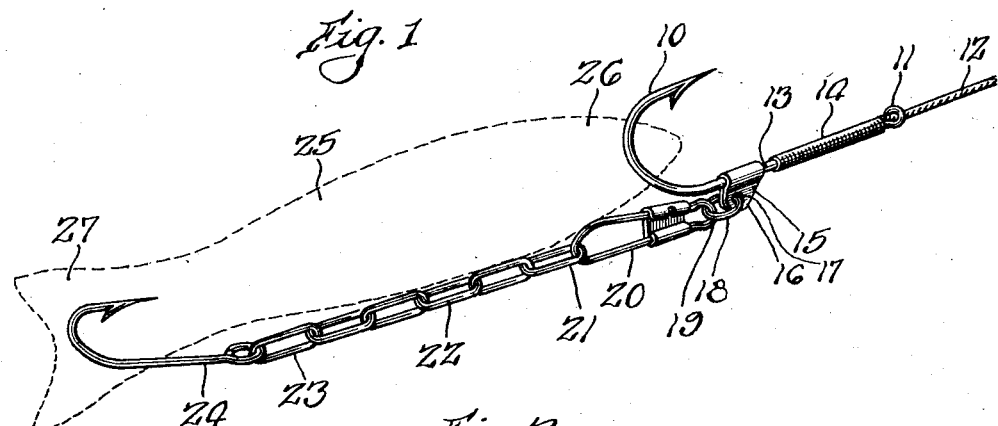
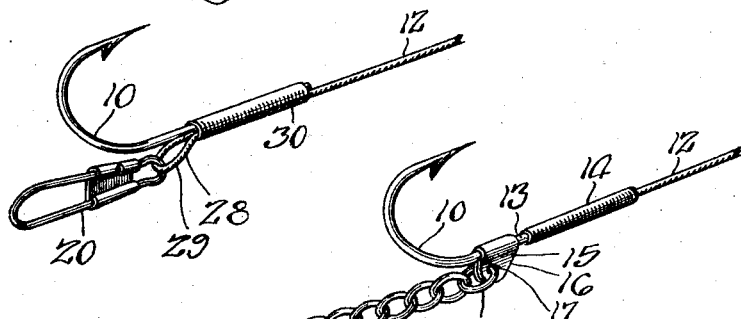
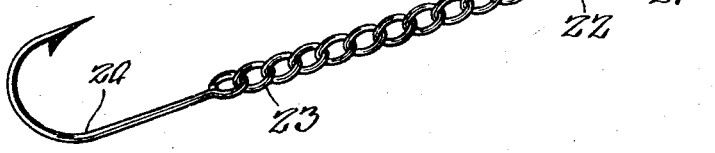
Robert J. Blum
INVENTOR
BY Victor J. Evans & Co.
HIS ATTORNEYS Patented Feb. 28, 1933

1,899,790

UNITED STATES PATENT OFFICE

ROBERT J. BLUM, OF MARENGO, ILLINOIS

FISHING APPARATUS

Application filed May 13, 1931. Serial No. 537,148.

This invention relates to certain novel improvements in fishing apparatus, and has for its principal object the provision of an improved construction of this character which will be highly efficient in use and economical in manufacture.

The present invention is concerned with fish hooks especially adapted for trolling and casting, and may be efficiently used for still fishing.

In trolling and casting the best results are usually obtained where the lure, which might be a minnow, chub, sucker or the like, is so disposed as to have a natural or life like appearance and this may be accomplished by baiting the lure on the hook in such a manner as will permit the same to be in upright position. It is, therefore, one of the many objects of this invention to provide a fish hook especially adapted for the purpose and which is of such a structure as will allow the lure to be in upright position.

A still further object of the invention is to provide a fish hook for the purpose which will permit effective baiting of short lures and retaining the same in baited position, thus alleviating the possibility of loss of the lure.

A still further object of the invention is to provide a fish hook for the purpose which will require less time on the part of the angler to set the fish hook instead of waiting until the object is so disposed with respect to the hook elements for catching.

A still further object of the invention is to provide a fish hook for the purpose which may be associated with the common and usual double or single snelled hook usually employed for still fishing.

A still further object of the invention is to provide a fish hook for the purpose which is capable of adjustment by the angler, thereby to accommodate lures of various sizes.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a perspective view of the fish hook embodying the invention, showing one form of construction;

Fig. 2 is a fragmentary perspective view of the fish hook embodying the invention, showing a modified form of construction; and Fig. 3 is a perspective view of the invention showing a still further modified form of construction.

Referring particularly to Fig. 1, illustrating one form of construction of the invention, a fish hook is indicated at 10 and this hook may be of the common type used in connection with still fishing and which includes the usual eyelet 11 through which the cable wire 12 is passed and connected to the shank 13 of the hook by the usual snelling 14.

On the shank 13 adjacent one end of the snelling 14 is mounted a clip 15 which may be formed substantially U-shaped to embrace the shank 13. This clip 15 includes perforated ears 16 and inserted through the perforations 17 thereof is a ring 18 to which is attached as at 19 one end portion of a safety snap 20 which may be of any approved or conventional construction. To this safety snap 20 is detachably connected the end link 21 of a chain 22 which may be of any size and formed from any approved material which will best serve the purpose. To the opposite end link 23 is attached the tail hook 24 which likewise may be of any approved type such as is commonly used for still fishing.

In use, the lure 25 is disposed relative to the chain 22 so that the chain 22 will be disposed longitudinally of the belly of the lure with the head hook 10 projected through the head portion 26. The chain 22 is arranged longitudinally of the lure in the position indicated by attaching the tail hook 24 to the tail portion 27 of the lure. This is accomplished by passing the tail hook through the tail of the lure in a transverse direction, thereby effectively disposing the chain 22 in the position indicated so that the lure will pass through the water in an upright position and thereby have a natural and life like appearance.

By the use of a hook as illustrated in Fig.

1, it is manifest that if the object strikes the lure at the mid-portion thereof, the tail hook 24 will be effective in immediately hooking the object by the quick action of the angler. If the lure is struck in the head region the same result is accomplished. From this it will be apparent that as soon as the object strikes the lure the same may be hooked either by the head hook or by the tail hook.

In Fig. 2 I have illustrated a slightly modified form of construction, and in this form as illustrated, the cable wire 12 is looped at its end 28 to provide a loop 29 below the snelling 30 and to this loop 29 and the snap 20 is effectively connected.

In Fig. 3 I have shown the link 21 of the chain 22 connected directly to the clip 15 thereby dispensing with the safety snap 20.

The device as shown in the drawing and herein described provides a flexible connection between the head hook 10 and the tail hook 24. This flexible connection is, as described, in the form of a chain made up of interconnected links which may be adjusted to accommodate the sizes of the lure by taking up one or more of the links by means of the safety snap 20. In case the safety snap 20 is not employed in the construction, the shortening of the chain may be accomplished by looping the chain over the point of the lead or head hook and allowing the chain to rest in the bend of the hook. Inasmuch as the connection between the head hook and the tail hook is of a flexible nature it is obvious that the chain will not have the tendency to tilt or tip the lure which is the usual result where a taut or substantially taut connection between the head hook and tail hook is employed.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A fishing device of the class described including a head hook, a tail hook, and a flexible connection between the head hook and the tail hook, said flexible connection comprising a plurality of link members and a snap carried by said head hook whereby to vary the length of said chain and adjust said head hook and tail hook relative to each other.

2. A fishing device of the class described comprising a head hook including a shank, a clip mounted on the shank, a snap having connection with the clip, an elongated connector having one end portion connected to the snap, a tail hook having connection with the opposite end portion of the connector.

3. A fishing device of the class described comprising a head hook including a shank, a clip mounted on the shank, a snap having connection with the clip, an elongated connector chain having one end portion detachably connected to the snap, a tail hook having connection with the opposite end portion of the connector, so that the length of said chain and the resulting distance between said hooks may be varied by connecting said snap to a predetermined link in said chain.

In testimony whereof I affix my signature.

ROBERT J. BLUM.